United States Patent
Takahashi

(10) Patent No.: US 9,364,125 B2
(45) Date of Patent: Jun. 14, 2016

(54) BACKPACK POWER APPARATUS

(71) Applicant: MAKITA CORPORATION, Aichi (JP)

(72) Inventor: Yuji Takahashi, Aichi (JP)

(73) Assignee: MAKITA CORPORATION, Aichi (JP)

( * ) Notice: Subject to any disclaimer, the term of this patent is extended or adjusted under 35 U.S.C. 154(b) by 489 days.

(21) Appl. No.: 13/895,766

(22) Filed: May 16, 2013

(65) Prior Publication Data

US 2013/0312213 A1 Nov. 28, 2013

(30) Foreign Application Priority Data

May 23, 2012 (JP) .................................. 2012-117921

(51) Int. Cl.
*A47L 5/14* (2006.01)
*A47L 5/36* (2006.01)
*A01G 1/12* (2006.01)
*E01H 1/08* (2006.01)

(52) U.S. Cl.
CPC . *A47L 5/14* (2013.01); *A01G 1/125* (2013.01); *A47L 5/36* (2013.01); *E01H 1/0809* (2013.01); *E01H 1/0836* (2013.01)

(58) Field of Classification Search
CPC ........... A47L 5/15; A47L 5/36; E01H 1/0836; E01H 1/089
USPC ........................................ 15/327.5, 345, 405
IPC .......................................................... A47L 5/14
See application file for complete search history.

(56) References Cited

U.S. PATENT DOCUMENTS 7,600,290 B1    10/2009    Peters
2005/0051583 A1    3/2005    Herzog

FOREIGN PATENT DOCUMENTS

FR    1507514    12/1967
JP    4769685    6/2011

OTHER PUBLICATIONS

Search Report issued by E.P.O. patent office in E.P.O. Patent Application No. 13002653.7, dated Aug. 13, 2014.

*Primary Examiner* — David Redding
(74) *Attorney, Agent, or Firm* — Greenblum & Bernstein, P.L.C.

(57) ABSTRACT

A backpack power apparatus is comprised of a back carrier frame for being piggybacked by a user, a blower unit including a fan driven by a drive motor for sucking in or blowing out air through an airflow duct, and an airflow tube fluidically communicating with the airflow duct of the blower unit for sucking in or blowing out air through the airflow tube. The blower unit is mounted on the back carrier frame via a vibration isolating means, and the airflow tube is supported on the back carrier frame and adapted for being held and operated by the user when in use. The airflow tube is floatingly coupled to the airflow duct of the blower unit.

9 Claims, 7 Drawing Sheets

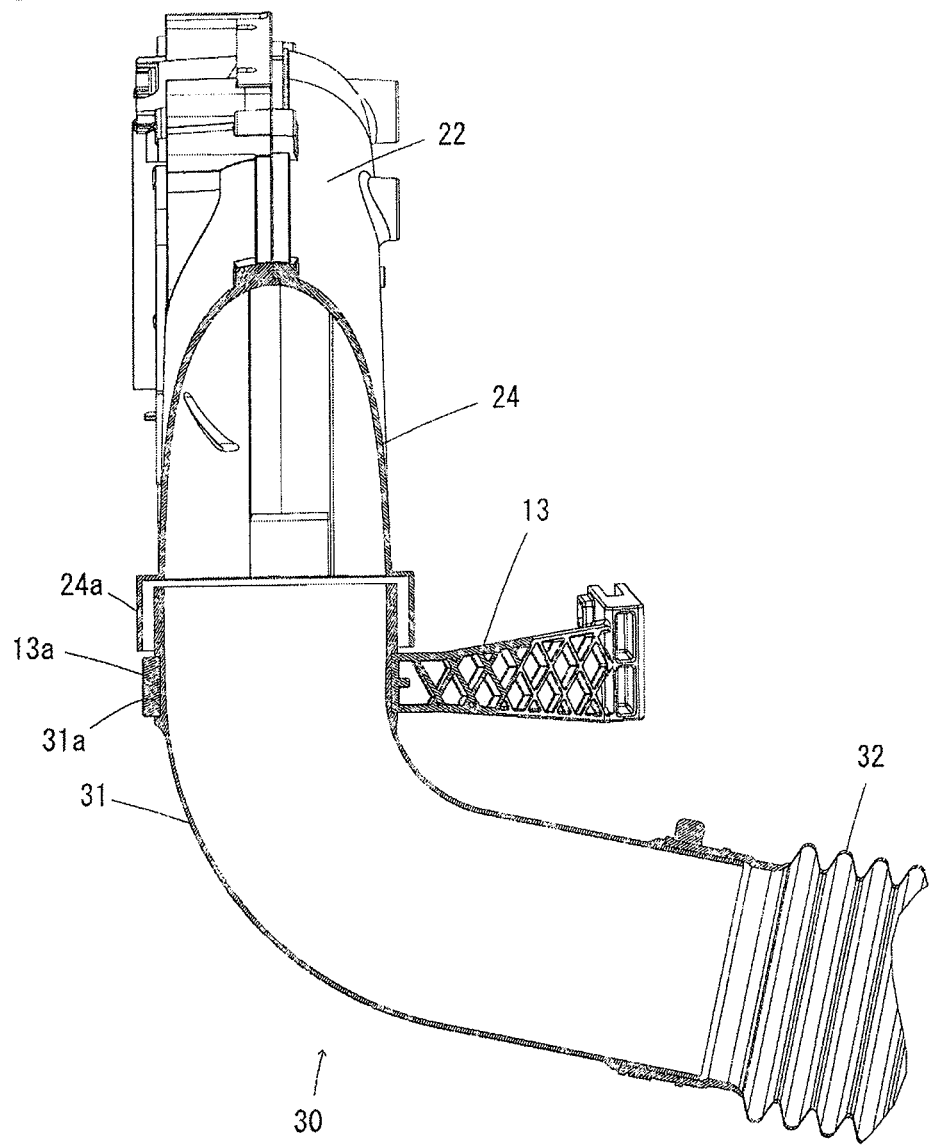

BACKPACK POWER APPARATUS

TECHNICAL FIELD

The present invention relates to a backpack power apparatus such as a backpack blower apparatus and a backpack suction apparatus which comprises a back carrier frame for being piggybacked by a user and a blower unit including a fan driven by a drive motor for sucking in or blowing out air through an airflow duct, in which the blower unit is mounted on the back carrier frame via a vibration isolating means and in addition an airflow tube working as a blowoff tube or a suction tube is floatingly coupled to the airflow duct so that undesirable vibrations caused by the motor driven fan will be prevented from being transmitted to the airflow tube which is to be held and operated by the user when in use.

BACKGROUND INFORMATION

An example of a backpack blower apparatus which is a kind of backpack power apparatus is disclosed in Japanese patent No. 4,769,685, which comprises a back carrier frame to be piggybacked by a user and a blower unit including a fan driven by a drive motor for blowing out air through a blow-out duct, in which the blower unit is mounted on the back carrier frame via a vibration isolating means and in which a blowoff tube is coupled to the blow-out duct, where the blowoff tube is held and operated by the user when in use.

With the backpack blower apparatus mentioned above, the blower unit is mounted on the back carrier frame via the vibration isolating means, and hence the vibrations caused by the blower unit will be little transmitted to the back of the user. However, as the blowoff tube which is to be held and operated by the user is connected to the blower unit (i.e. the source of vibration), the user is regrettably apt to get tired by holding the blowoff tube which is vibrating due to the blower unit when in use. In order to cope with this drawback, the blowoff tube is provided with a bellows-like flexible pipe at the position between the grip handle which the user holds with a hand and the blow-out duct of the blower unit. However, the bellows cannot sufficiently cut the transmission of the vibrations from the blower unit to the grip handle of the blowoff tube, as the flexibility of the bellows is limited.

SUMMARY OF THE INVENTION

In view of the foregoing circumstances, therefore, it is a primary object of the present invention to obviate the above-mentioned drawback residing in the conventional backpack blower apparatus, and to provide a backpack power apparatus such as a backpack blower apparatus and a backpack suction apparatus in which the vibrations of the blower unit will be hindered from being transmitted to the airflow tube such as a blowoff tube and a suction tube which the user holds and operates when in use.

According to the present invention, the object is accomplished by providing a backpack power apparatus comprising: a back carrier frame for being piggybacked by a user; a blower unit including a fan driven by a drive motor for blowing out or sucking in air through an airflow duct, the blower unit being mounted on the back carrier frame via a vibration isolating means; and an airflow tube fluidically communicating with the airflow duct of the blower unit for blowing out or sucking in air by the airflow tube, the airflow tube being adapted for being held and operated by the user when in use, wherein the airflow tube is supported on the back carrier frame and has a proximal end, the air flow duct has a distal end, and the proximal end of the airflow tube is floatingly coupled to the distal end of the airflow duct of the blower unit.

With the backpack power apparatus configured as above, the vibrations of the blower unit will not be transmitted from the airflow duct to the airflow tube, which in turn alleviate the fatigue on the side of the user holding the airflow tube.

In the backpack power apparatus configured as above, the proximal end of the airflow tube and the distal end of the airflow duct of the blower unit may be coupled together by means of an airtight seal member which has a property of preventing vibrations of the airflow duct of the blower unit from being transmitted to the airflow tube, so that an air leakage from the coupling arrangement will be prevented, which in turn prevents a decrease in the amount of the air flowing out of or into the airflow tube from its distal end port.

Further, in the backpack power apparatus configured as above, the airtight seal member may be made of rubber sponge so that the airtight seal member can be easily manufactured.

The backpack power apparatus of the present invention can be a backpack blower apparatus where the airflow duct works as a blow-out duct for the blower unit to blow out air through the airflow tube, which is now a blowoff tube, and can also be a backpack suction apparatus where the airflow duct works as a suck-in duct for the blower unit to suck in air through the airflow tube, which is now a suction tube.

BRIEF DESCRIPTION OF THE DRAWINGS

For a better understanding of the present invention, and to show how the same may be practiced and will work, reference will now be made, by way of example, to the accompanying drawings, in which:

FIG. 3 is a fragmentary sectional end view of the part of the backpack blower apparatus where a blowoff tube is floatingly coupled to a blow-out duct;

FIG. 5a is a fragmentary sectional end view of the part of a second embodiment of a backpack blower apparatus according to the present invention where a blowoff tube is floatingly coupled to a blow-out duct of the blower unit by means of a sealing member interposed between the proximal end of the blowoff tube and the distal end of the blow-out duct of the blower unit;

FIG. 5b is a fragmentary sectional end view of the coupling structure of the blowoff tube and the blow-out duct taken along the line A-A of FIG. 5a;

DETAILED DESCRIPTION OF EMBODIMENTS OF THE INVENTION

Figure 1:
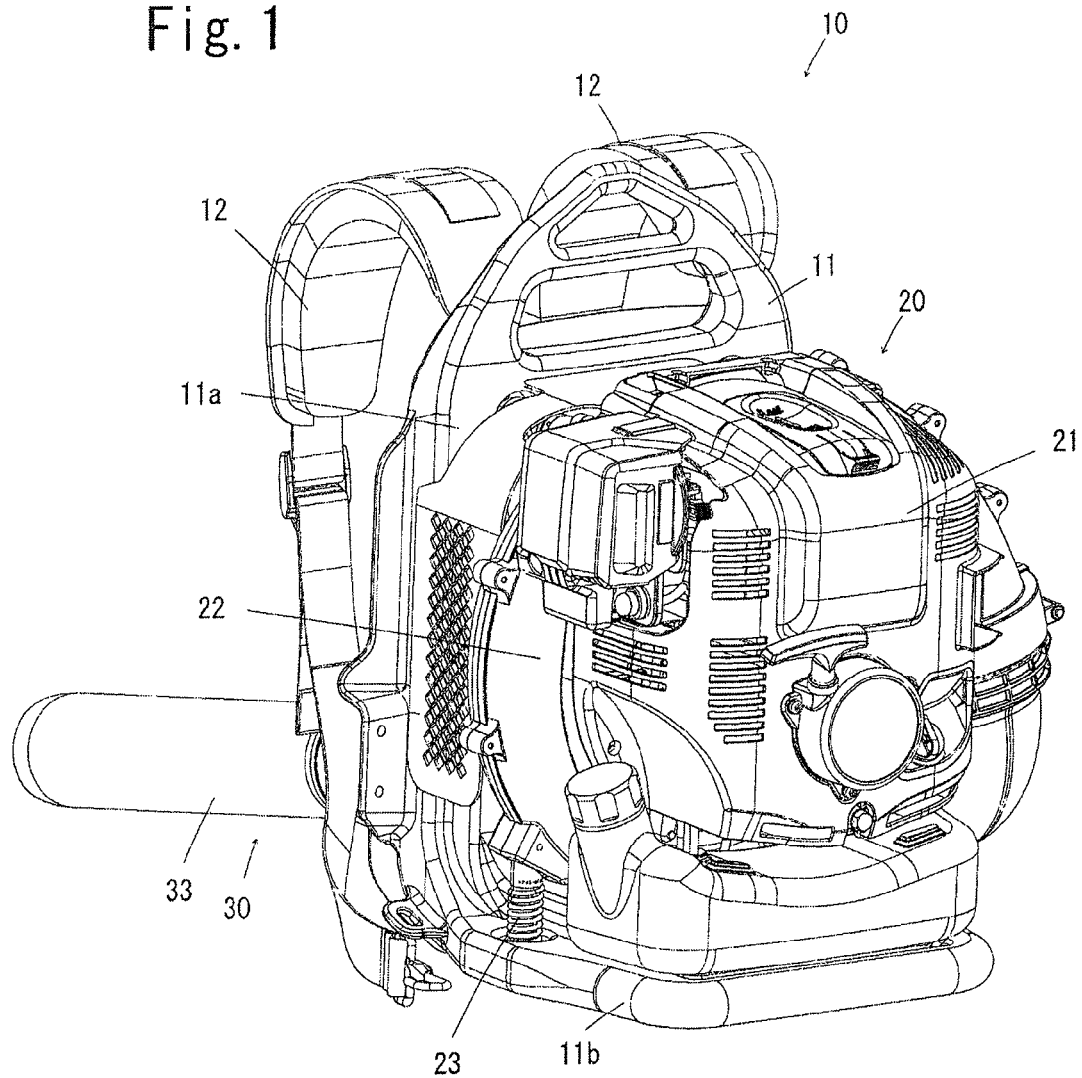
FIG. 1 is a rear perspective view of a first embodiment of a backpack blower apparatus according to the present invention.

The invention and its various embodiments can now be better understood by turning to the following detailed description of the preferred embodiments with reference to the accompanying drawings. The embodiments of the backpack power apparatuses hereunder described are backpack blower apparatuses and a backpack suction apparatus.

It should be expressly understood that the illustrated embodiments are presented just as practicable examples of the invention and that the invention as defined by the claims may be broader than the illustrated embodiments described below. In the drawing, like reference characters refer to like parts so that repetitive explanations may be omitted.

First Embodiment

Figure 2:
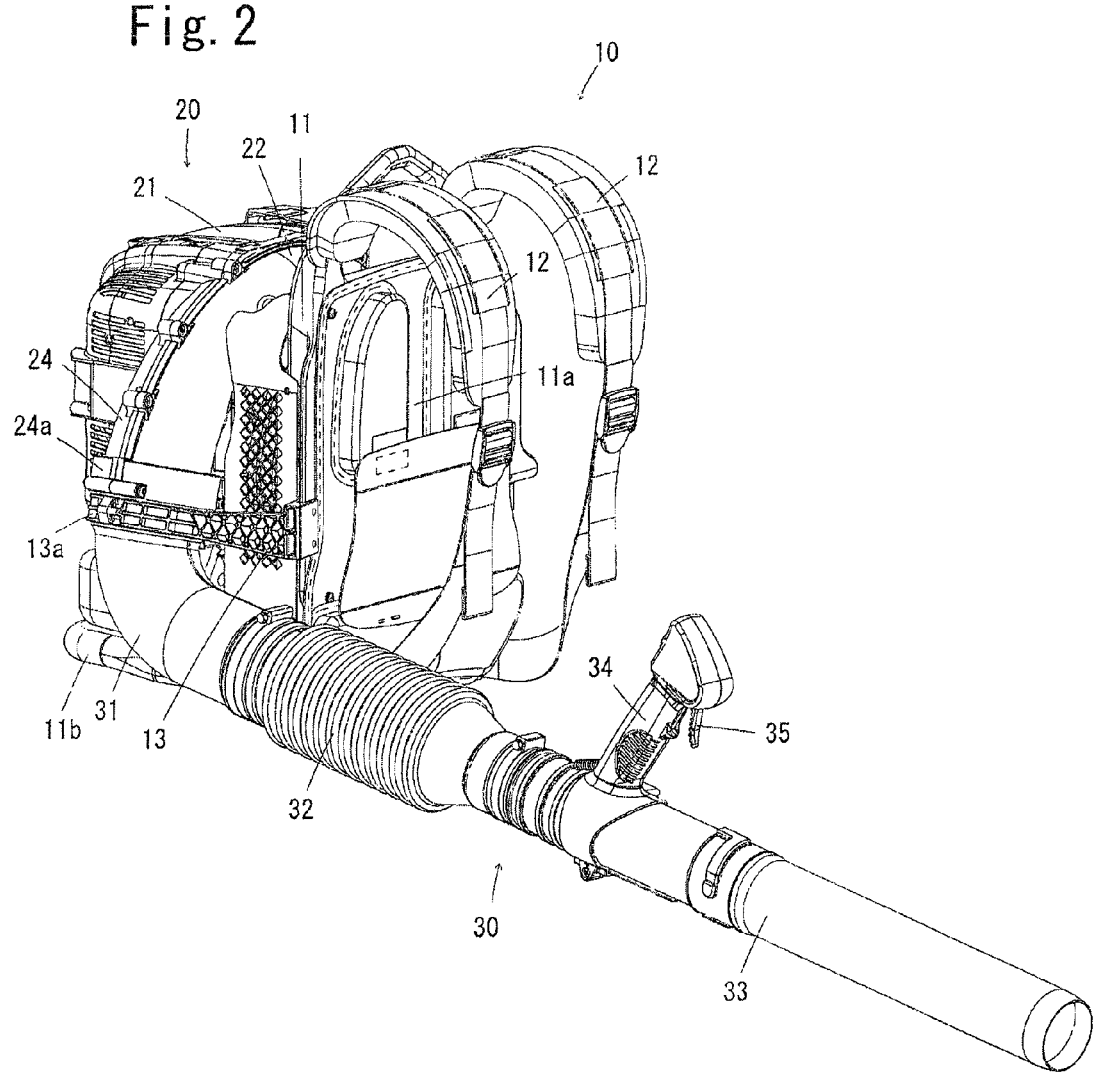
FIG. 2 is a front perspective view of the backpack blower apparatus shown in FIG. 1.

FIGS. 1 and 2 illustrate, in a rear and front perspective views, respectively, a backpack blower apparatus 10, which comprises a back carrier frame 11 for being piggybacked by the user, a blower unit 20 including a fan driven by a drive motor 21 for sucking in air from the atmosphere and blowing out air through a blow-out duct (airflow duct) 24, the blower unit 20 being mounted on the back carrier frame 11 via a vibration isolating means (coil springs 23 or the like elastic mounting members), and a blowoff tube (airflow tube) 30 floatingly coupled to the outlet port (distal end port) of the blow-out duct 24 of the blower unit 20 to fluidically communicate with the blow-out duct 24. FIG. 3 illustrates, in a fragmentary sectional end view, how the blowoff tube 30 is coupled to the blow-out duct 24 of the blower unit 20 in the backpack blower apparatus 10. The proximal end portion of the blowoff tube 30 is supported by a supporting arm 13 on the back carrier frame 11 and is floatingly coupled to the distal end (outlet end) of the blow-out duct 24 so that the vibrations of the blower unit 20 will not be transmitted to the blowoff tube 30, while the blowoff tube 30 is fluidically communicating with the blow-out duct 24.

The configuration of the backpack blower apparatus 10 of the first embodiment will be described in more detail hereunder. The back carrier frame 11 is for the user to piggyback and carry the blower unit 20 when using the apparatus. The back carrier frame 11 comprises a back contact member 11a extending vertically for contacting the back of the user and a base member 11b extending horizontally from the bottom portion of the back contact member 11a for supporting the blower unit 20, constituting a generally L-shaped configuration. On the back contact member 11a of the back carrier frame 11 are provided a pair of shoulder straps 12, 12 for the user to piggyback the back carrier frame 11. A supporting arm 13 is fixed to the right side part of the back carrier frame 11 for supporting the blowoff tube 30.

The blower unit 20 comprises a centrifugal fan (not shown) driven by the drive motor 21 for sucking in air from the atmosphere and blowing out air from an outlet port of the blow-out duct 24. In this embodiment, an internal combustion engine is employed as the drive motor 21, while an electric motor may be employed instead. The fan is installed in a volute casing 22, in which the drive motor 21 is also installed to rotate the fan.

The blower unit 20 is mounted on the back carrier frame 11 via the vibration isolating means, with coil springs 23 interposed between the bottom of the blower unit 20 and the base member 11b of the back carrier frame 11 and with elastic rubber mounting members (not shown) interposed between the front side face of the blower unit 20 and the back contact member 11a, the coil springs 23 and the rubber mounting members constituting the vibration isolating means.

The volute casing 22 is formed with an air intake aperture (not shown) in its front side face and with the air blow-out duct 24 in a tubular shape in its right side integrally. The tubular blow-out duct 24 is formed at its distal end a diameter-enlarged part 24a, to which is floatingly coupled the proximal end of the blowoff tube 30 which is supported on the back carrier frame 11 via the supporting arm 13.

The blowoff tube 30 is held by the user when in use and blows the air blown out from the blower unit 20 off from the distal end port thereof. The blowoff tube 30 comprises an elbow part 31 floatingly coupled to the blow-out duct 24 of the blower unit 20, a flexible part 32 comprised of flexible bellows connected to the distal end of the elbow part 31, and a straight part 33 connected to the distal end of the flexible part 32 and extending straight.

The elbow part 31 is formed, near its proximal end, with an annular groove 31a, in which an annular part 13a of the supporting arm 13 (formed at its outer end) is engaged slidingly rotatably in the circumferential direction but restrained in the axial direction. Under the condition that the elbow part 31 is supported by the supporting arm 13, the proximal end of the elbow part 31 is positioned radially and axially apart from the inner circumferential surfaces of the diameter-enlarged part 24a of the blow-out duct 24. Between the diameter-enlarged part 24a of the blow-out duct 24 and the proximal end of the elbow part 31 of the blowoff tube 30, there is secured a sufficient gap for the diameter-enlarged part 24 of the blow-out duct 24 and the proximal end of the elbow part 31 of the blowoff tube 30 not to touch each other even when the blower unit 20 vibrates.

On the straight part 33 of the blowoff tube 30 is fixed a grip handle 34 to hold and control the blowoff tube 30, and on the grip handle 34 is provided a control lever (throttle lever) 35 for controlling the output power of the drive motor 21 of the blower unit 20.

Hereinafter will be described how the backpack blower apparatus 10 of the above-mentioned configuration works. The operator first starts the drive motor (engine) 21 of the blower unit 20, and then piggybacks the back carrier frame 11 with right hand holding the grip handle 34 of the blowoff tube 30. The user operates the control lever 35 to blow off air from the outlet port of the straight part 33 of the blowoff tube 30. Under these circumstances, the blower unit 20 vibrates due to the rotation of the drive motor 21 and the fan, the vibrations of the blower unit 20 will be little transmitted to the back carrier frame 11, as the blower unit 20 is elastically mounted on the back carrier frame 11 via the coil springs 23 and the rubber mounting members.

The blowoff tube 30 is supported, via the supporting arm 13, on the back carrier frame 11 to which the vibrations of the blower unit 20 will hardly be transmitted, with the proximal end of its elbow part 31 floatingly coupled to the blow-out duct 24 of the blower unit 20 to communicate with each other. Thanks to this configuration, when the blower unit 20 vibrates, the blow-out duct 24 of the blower unit 20 only vibrates by itself moving alone relative to the blowoff tube 30 and not influencing the blowoff tube 30. Thus, the vibrations of the blower unit 20 will not be transmitted to the blowoff tube 30 from the blow-out duct 24, and the operating user will be hardly fatigued even holding the grip handle 34 of the blowoff tube 30.

Figure 4A:
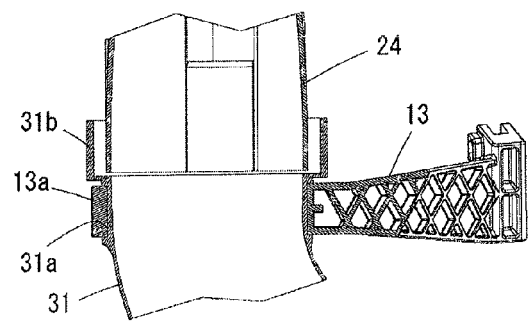
FIGS. 4a through 4d are fragmentary sectional end views showing various modifications of the structures of floatingly coupling the blowoff tube to the blow-out duct.
Figure 4B:
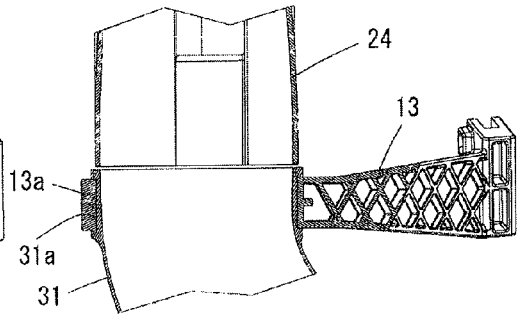
Figure 4C:
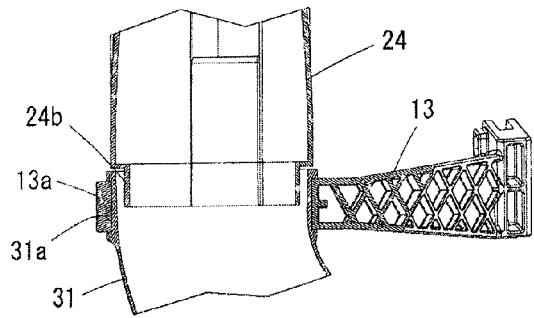
Figure 4D:
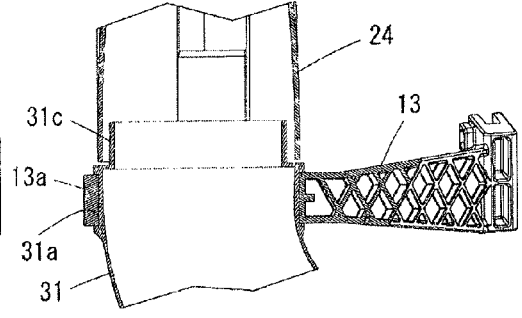

While, in the above described embodiment, the proximal end of the elbow part 31 of the blowoff tube 30 is floatingly inserted into the diameter-enlarged part 24a of the blow-out duct 24 of the blower unit 20 with a gap provided therebetween, various modifications of the coupling structure may be employed as shown in FIGS. 4a through 4d. FIG. 4a shows a modified structure where the blow-out duct 24 does not have a diameter-enlarged part 24a at its distal end, but the elbow part 31 of the blowoff tube 30 is provided with a diameter-enlarged part 31b at its proximal end instead, and the distal end (outlet port) of the blow-out duct 24 is floatingly inserted into the diameter-enlarged part 31b at the proximal end of the elbow part 31 to communicate with each other. FIG. 4b shows another modified structure where neither the blow-out duct 24 nor the elbow part 31 has a diameter-enlarged part, but the distal end port of the blow-out duct 24 and the proximal end port of the elbow part 31 are confronting each other with a gap secured therebetween in the axial direction to communicate airflow with each other. FIG. 4c shows a further modified structure where the blow-out duct 24 is provided at its distal end with a diameter-reduced part 24b in place of the diameter-enlarged part 24a, and the diameter-reduced part 24b at the distal end of the blow-out duct 24 is floatingly inserted into the proximal end port of the elbow part 31 to communicate with each other. FIG. 4d shows a still further modified structure where the blow-out duct 24 does not have a diameter-enlarged part 24a at its distal end, but the elbow part 31 of the blowoff tube 30 is provided at its proximal end with a diameter-reduced part 31c, and the reduced-diameter part 31c at the proximal end of the elbow part 31 is floatingly inserted into the distal end port of the blow-out duct 24 to communicate with each other.

Second Embodiment

Figures 5A, 5B:
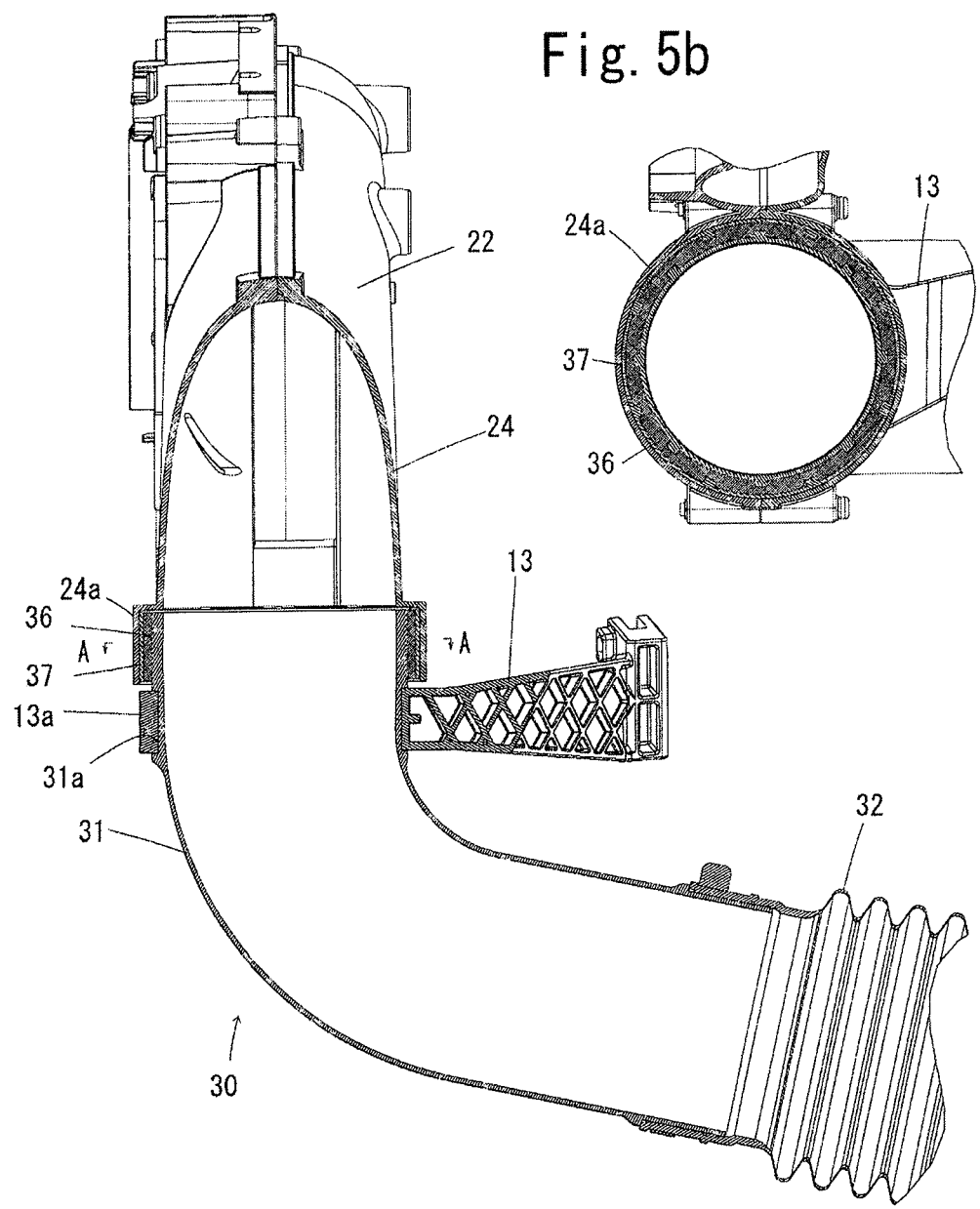

FIGS. 5a and 5b illustrate, each in a fragmentary sectional end view, the part of a second embodiment of a backpack blower apparatus 10 according to the present invention where a blowoff tube is floatingly coupled to a blow-out duct of the blower unit. In this embodiment, a seal member 36 made of a rubber sponge is interposed between the inner circumferential wall of the diameter-enlarged part 24a of the blow-out duct 24 and the outer circumferential wall of the proximal port end of the blowoff tube 30 for preventing air leakage at the coupling point. The seal member 36 is a tubular member made of a polyurethane rubber sponge having a modulus of elasticity effective to prevent the vibrations of the blow-out duct 24 from being transmitted to the blowoff tube 30. The density of the seal member 36 is selected to be less than 100 kg/m³, and preferably less than 30 kg/m³, in order to realize a modulus of elasticity effective to prohibit the transmission of vibrations therethrough. When the density of the rubber sponge is selected to be lower to effectively cut the transmission of vibrations, the axial length of the seal member 36 is preferably selected to be longer in order to effectively prevent air leakage.

The length in the axial direction of the seal member 36 made of rubber sponge is determined as follows. First, the characteristic of rubber sponge material is evaluated by measuring the variation of the pressure loss P (in kPa) versus the variation of the wind velocity V (in m) using a piece of rubber sponge having a predetermined length t (in m). The relation between P and V is determined as the equation:

$$P = \alpha V^2 \quad \text{(Eq. 1)}.$$

The gradient (coefficient) $\alpha$, on the other hand, varies proportionally in response to the variation in the length t (in m) of the rubber sponge piece under a certain wind velocity V, and the relation is expressed as the equation:

$$\alpha = \beta t \quad \text{(Eq. 2)},$$

where $\beta$ is the factor of proportionality.

The above two equations derive the equation:

$$t = P/\beta V^2 \quad \text{(Eq. 3)}.$$

It is here supposed that the maximum pressure $P_{max}$ is developed at the position where the rubber sponge is disposed, for example when the distal end port of the blow-out duct 24 is narrowed (or closed).

Where the air flow rate at the outlet port end of the blow-out duct 24 is $Q_o$, the cross section of the outlet port end of the blow-out duct 24 is $S_o$, the cross section of the rubber sponge is $S_s$, and the tolerable amount of air leakage through the rubber sponge is 1% (i.e. the air flow rate through the rubber sponge $Q_s$ is $Q_s = Q_o * 0.01$), then the wind velocity through the rubber sponge $V_s$ is $V_s = Q_s/S_s$. Substituting these $P_{max}$ and $V_s$ in the Eq. 3, the axial length t of the rubber sponge necessary for suppressing the air leakage through the rubber sponge below 1% will be obtained.

The seal member 36 is adhered on the outer circumferential surface of the proximal end of the elbow part 31 of the blowoff tube 30. On the outer circumferential surface of the seal member 36 is adhered a sleeve member 37 made of resin. The sleeve member 37 is to prevent abrasion of the seal member 36 due to the direct friction between the seal member 36 and the inner circumferential wall of the diameter-enlarged part 24a of the blow-out duct 24. While, in this embodiment, the seal member 36 is adhered on the outer circumferential surface of the proximal end of the elbow part 31 of the blowoff tube 30, the seal member 36 may be adhered on the inner circumferential wall of the diameter-enlarged part 24a of the blow-out duct 24 with the sleeve adhered on the inner circumferential surface of the seal member 36.

With the above configured backpack blower apparatus 10, the air blown out from the blow-out duct 24 is prevented from leaking out at the coupling arrangement between the blow-out duct 24 and the blowoff tube 30, which will suppress decrease in the amount of air flow blown out from the distal end port of the blowoff tube 30. When an attachment having a narrowed diameter is connected to the distal end of the straight part 33 of the blowoff tube 30 in order to increase the blowoff pressure, the pressure in the blowoff tube 30 would increase and air leakage would happen at the coupling position between the blow-out duct 24 and the blowoff tube 30. However, with this second embodiment which is provided with the seal member 36 interposed between the blow-out duct 24 and the proximal end of the blowoff tube 30, air leakage can be prevented even when an attachment is connected to the outlet port of the blowoff tube 30. It should be understood that the backpack blower apparatus of the second embodiment may employ various modifications of the coupling arrangement (as shown in FIGS. 4a through 4d) plus the seal member 36 interposed between the blow-out duct 24 and the proximal end of the blowoff tube 30.

Figure 6A:
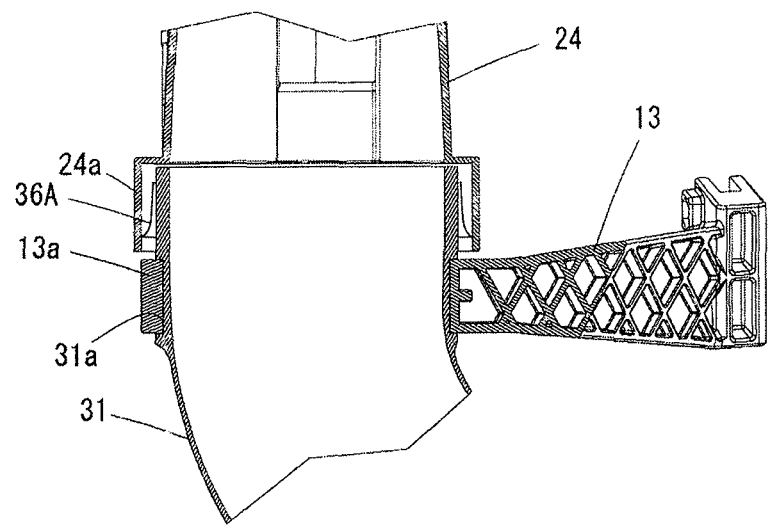
FIGS. 6a and 6b each are fragmentary sectional end views of the coupling structure of the blowoff tube and the blow-out duct where the blowoff tube and the blow-out duct are coupled together with a seal member made of a rubber sheet interposed therebetween.
Figure 6B:
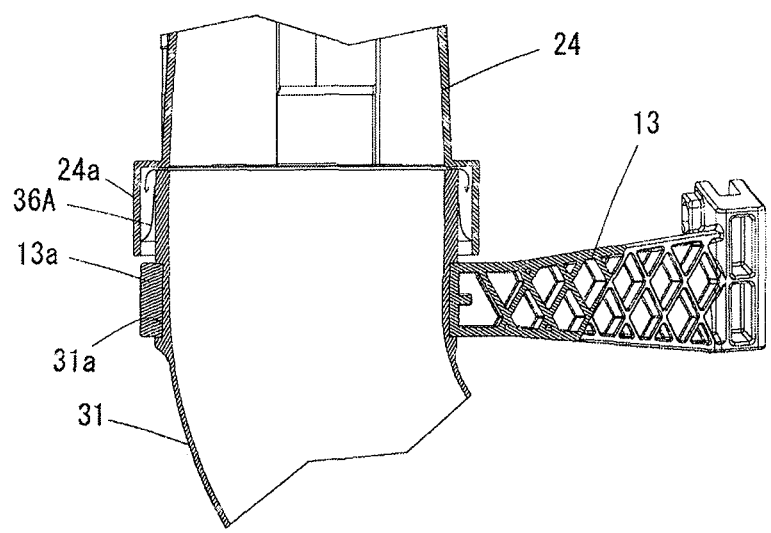

While, in the above-described embodiment, the seal member 36 made of rubber sponge is interposed between the blow-out duct 24 and the proximal end of the blowoff tube 30, a seal member 36A made of a thin rubber sheet may be interposed between the blow-out duct 24 and the proximal end of the blowoff tube 30 as shown in FIGS. 6a and 6b. The seal member 36A is in the shape of a tapered cylinder (i.e. frustum side surface) of which the larger diameter part is adhered on the inner circumferential wall of the diameter-enlarged part 24a of the blow-out duct 24 near the outmost end and the smaller diameter part is directed toward the inner direction of the blow-out duct 24. When air is not leaking through the axial gap between the blow-out duct 24 and the proximal end of the blowoff tube 30, the narrower end circumference of the seal member 36A does not touch the proximal end circumference of the blowoff tube 30 as illustrated in FIG. 6a. When air leaks through the axial gap between the blow-out duct 24 and the proximal end of the blowoff tube 30, the outer side of the frustum shaped seal member 36A receives the leaking air and is pressed against the outer circumferential wall of the proximal end portion of the blowoff tube 30 and the narrower end circumference of the seal member 36A touches the outer circumferential wall of the proximal end portion of the blowoff tube 30 thereby stopping the air leakage. As the seal member 36A is a thin member, the vibrations of the blower unit 20 will not be substantially transmitted to the blowoff tube 30, even though the narrower end of the seal member 36A temporarily touches the outer circumference of the proximal end portion of the blowoff tube 30.

In the sealing configuration employed in the embodiments of the present invention, unlike in the conventional sealing configuration, neither the seal members 36 made of rubber sponge nor the seal member 36A made of a thin rubber sheet exert any force in the radial direction on to the blow-out duct 24 and the blowoff tube 30 in order to stay fixed there, which means that the blowoff tube 30 is floatingly coupled to the blow-out duct 24.

Third Embodiment

Figure 7:
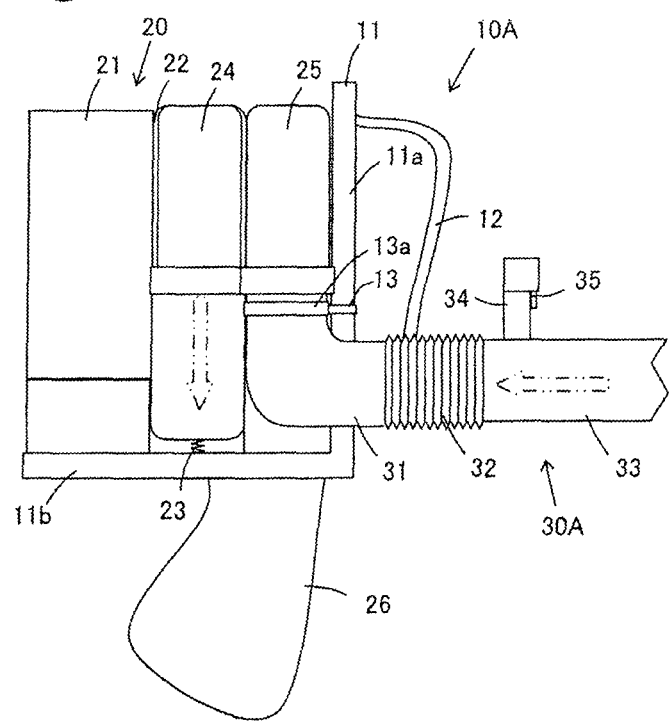
FIG. 7 is a diagrammatic representation of a backpack suction apparatus as a third embodiment of the present invention.

FIG. 7 illustrates, in a diagrammatic representation, a backpack suction apparatus as a third embodiment of the backpack power apparatus according to the present invention. In this embodiment, a backpack suction apparatus 10A comprises a back carrier frame 11 for being piggybacked by the user, a blower unit 20 including a fan driven by a drive motor 21 for sucking in air through a suck-in duct (airflow duct) 25, collecting dust or leaves in a dust bag (or leaf collecting bag) 26 and blowing out air into the atmosphere through a blow-out duct 24 or some appropriate exhaust ports, the blower unit 20 being mounted on the back carrier frame 11 via a vibration isolating means (coil springs 23 or the like elastic mounting members) like in the case of the backpack blower apparatus described above, and a suction tube (airflow tube) 30A floatingly coupled to the intake port (distal end port) of the suck-in duct 25 of the blower unit 20 to fluidically communicate with the suck-in duct 24 and supported at its proximal end portion by a supporting arm 13 on the back carrier frame 11.

When the user operates the backpack suction apparatus 10A of this embodiment to suck in fallen leaves etc. from the distal end port of the suction tube 30A, the vibrations of the blower unit 20 will not be transmitted from the suck-in duct 25 to the suction tube 30A and therefore the user will not get fatigued even though the user operates the backpack suction apparatus holding the grip handle 34A fixed on the suction tube 30A. Also in this embodiment, the suction tube 30A and the suck-in duct 25 may be coupled by using various modifications of the coupling structure as explained in connection with the first embodiment described above. Further, a seal member 36 or 36A may be interposed between the suction tube 30A and the suck-in duct 25 as in the case of the second embodiment described above.

While, in the first through third embodiment described above, the airflow tube floatingly coupled to the airflow duct of the blower unit is rotatable relative to the airflow duct, the airflow tube may not necessarily be rotatable relative to the airflow duct of the blower unit. What is necessary and important is that the airflow tube is floatingly coupled to the airflow duct of the blower unit in order to enjoy the merits of the present invention.

While, in the first through third embodiment described above, the control lever (throttle lever) is disposed on the grip handle of the airflow tube, the present invention is not necessarily be limited to such a configuration. A separate control lever may be provided on the left side of the backpack power apparatus for the user to operate with his/her left hand. The user may hold the grip or directly the airflow tube to use the backpack power apparatus, and can enjoy the merits of decreasing vibrations of the airflow tube.

What is claimed is:

1. A backpack power apparatus, comprising:
a back carrier frame for being piggybacked by a user;
a blower including a fan driven by a drive motor for sucking in or blowing out air through an airflow duct, the blower being mounted on the back carrier frame via a vibration isolator;
an airflow tube fluidically communicating with the airflow duct of the blower for sucking in or blowing out air through the airflow tube, the airflow tube being adapted for being held and operated by the user when in use; and
a support connected to the airflow tube and the back carrier frame so as to support the airflow tube on the back carrier frame, the airflow tube having a proximal end and the airflow duct having a distal end, and wherein the support supportingly holds the airflow tube on the back carrier frame such that the proximal end of the airflow tube does not contact the distal end of the airflow duct.

2. A backpack power apparatus as claimed in claim 1, wherein the proximal end of the airflow tube and the distal end of the airflow duct are coupled together by an airtight seal member which has a property of preventing vibrations of the airflow duct of the blower from being transmitted to the airflow tube.

3. A backpack power apparatus as claimed in claim 2, wherein the airtight seal member is made of rubber sponge.

4. A backpack power apparatus as claimed in claim 1, wherein the backpack power apparatus is a backpack blower apparatus which blows out air from the airflow tube fluidically communicating with the airflow duct.

5. A backpack power apparatus as claimed in claim 1, wherein the backpack power apparatus is a backpack suction apparatus which sucks in air into the airflow tube fluidically communicating with the airflow duct.

6. A backpack power apparatus as claimed in claim 2, wherein the backpack power apparatus is a backpack blower apparatus which blows out air from the airflow tube fluidically communicating with the airflow duct.

7. A backpack power apparatus as claimed in claim 2, wherein the backpack power apparatus is a backpack suction apparatus which sucks in air into the airflow tube fluidically communicating with the airflow duct.

8. A backpack power apparatus as claimed in claim 3, wherein the backpack power apparatus is a backpack blower apparatus which blows out air from the airflow tube fluidically communicating with the airflow duct.

9. A backpack power apparatus as claimed in claim 3, wherein the backpack power apparatus is a backpack suction apparatus which sucks in air into the airflow tube fluidically communicating with the airflow duct.

* * * * *